United States Patent

[11] 3,589,210

| [72] | Inventor | Edwin W. Norman<br>Warren, Mich. |
|---|---|---|
| [21] | Appl. No. | 828,208 |
| [22] | Filed | May 27, 1969 |
| [45] | Patented | June 29, 1971 |
| [73] | Assignee | General Motors Corporation<br>Detroit, Mich. |

[54] ENERGY ABSORBER
4 Claims, 9 Drawing Figs.

| [52] | U.S. Cl. | 74/552 |
|---|---|---|
| [51] | Int. Cl. | B62d 1/10 |
| [50] | Field of Search | 74/552, 492, 493; 188/1 C |

[56] References Cited
UNITED STATES PATENTS

| 3,364,785 | 1/1968 | Geller | 74/552 |
|---|---|---|---|
| 3,412,628 | 11/1968 | De Gain | 188/1 (C) |
| 3,470,761 | 10/1969 | Okamoto et al. | 74/492 |

*Primary Examiner*—Fred C. Mattern, Jr.
*Assistant Examiner*—F. D. Shoemaker
*Attorneys*—W. E. Finken, H. Furman and D. L. Ellis ABSTRACT: An automotive vehicle steering assembly includes a safety steering wheel having a hub comprised of an energy absorbing member subject to axial crushing under predetermined force. The energy absorbing member is generally tubular and includes a circumferential series of longitudinal strip elements formed with a radially inward prebend to cause the strips to bend further radially inwardly during axial crush of the member, the prebend of each of the strips in the series being selected with respect to its neighbors such that the strips undergo buckling into an orderly overlapping relationship.

PATENTED JUN29 1971

INVENTOR
Edwin W. Norman
BY
D. L. Ellis
ATTORNEY

INVENTOR.
Edwin W. Norman
BY
D. L. Ellis
ATTORNEY

ENERGY ABSORBER

This invention relates to energy absorbers and more particularly to energy absorbing constructions usable in automotive vehicle steering assemblies and like instrumentalities.

In the U.S. Pat. No. 3,373,630, to Heurtebise issued Mar. 19, 1968 and assigned to the assignee of the present invention, disclosure is made of an energy absorbing construction usable in automotive vehicle steering assemblies or the like wherein a tubular member is provided with a circumferential series of longitudinally extending slots defining strip elements subject to controlled buckling under predetermined generally axially directed force on the tubular member, whereby such member utilizes the plastic deformation in the strip elements occurring after yield to absorb energy of impacts on the tubular member.

The present invention provides improvements in energy absorbing devices of this general character, particularly in the provision of such a tubular energy absorbing member wherein the various strip elements are each formed with a predetermined radially inward prebend so that upon the application of impact force of the predetermined level, the strip elements each buckle further radially inwardly of the tubular member allowing crush or axial displacement therein and absorption of the impact energy. Each of the strips in the series are provided with a predetermined prebend selected with respect to the prebend of its neighbors in the series such that under the axial crush in the member and the radially further inward bending of the strips, the strips buckle into an orderly underlapping or nesting configuration. By suitable selection of the angled prebends of the various strips, their length, their width, along with other factors, not only predictable buckling behavior is had in the tubular energy absorbing member but additional energy absorption over and above that of the simple buckling of the strip elements is had by interference in the overlapped relationship within the nested strip elements, and such nesting relationship causes the tubular member to seek an optimum generally fully axially flattened or crushed configuration even when the impact loadings thereon are at a substantial angle oblique to the axis thereof. Further, by the inward buckling of the strips, the tubular energy absorbing member is improved by removal of any radially outwardly extending portions thereof, particularly useful in applications such as for safety steering wheels.

Thus the primary object of this invention is to provide an improved energy absorber of the type including a tubular member having a circumferential series of longitudinally extending slots defining strip elements subject to controlled radial buckling under predetermined generally axial force on the member.

Another object of this invention is to provide such an energy absorber wherein the strips are provided with a predetermined radial inward prebend selected with reference to the neighbors thereto so that the strips undergo an orderly radially inward buckling into a nested or overlapping relationship when the tubular member is fully crushed.

Another object of this invention is to provide such an energy absorber wherein the radially inward buckling into the nested orderly relationship provides additional amounts of energy absorption by interference between the strips.

A further object of this invention is to use the orderly radially inward nesting of the various strip elements to enhance the crush performance of the energy absorber under substantial impact loadings oblique to the axis of the tubular member.

Another object of this invention is to provide an improved safety steering wheel construction for automotive vehicles wherein a hub portion of the wheel is formed of an energy absorbing tubular member constructed of a series of longitudinally extending slots defining strip elements subject to controlled radially inward buckling removing any tendency in the tubular member toward radial enlargement therein under axial crushing within the steering wheel.

These and other objects, features and advantages of the invention will be readily apparent from the following specification and from the drawings wherein.

Figure 1:
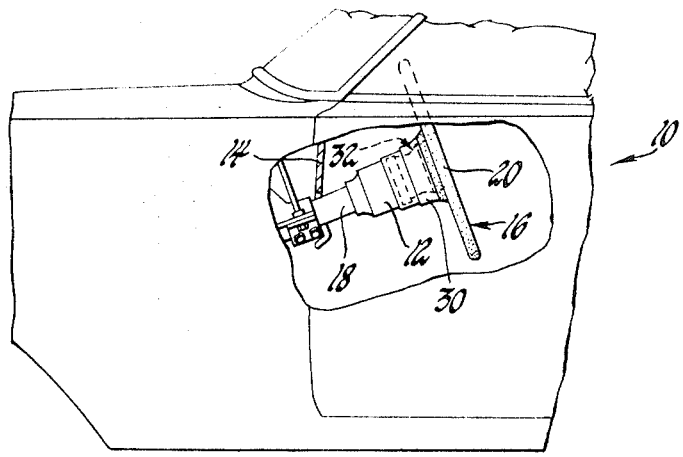
FIG. 1 is a fragmentary partially broken away view of an automotive vehicle including a steering assembly having a safety steering wheel incorporating the energy absorber of this invention.

Referring now particularly to FIG. 1 of the drawings, there is shown therein a portion of an automotive vehicle body 10 including a steering column assembly 12 suitably mounted to instrument panel structure 14 of the body and carrying within the passenger compartment at its upper end a safety steering wheel 16 operatively connected with the steering shaft portion which is housed by the usual mast jacket or tube 18.

Figure 2:
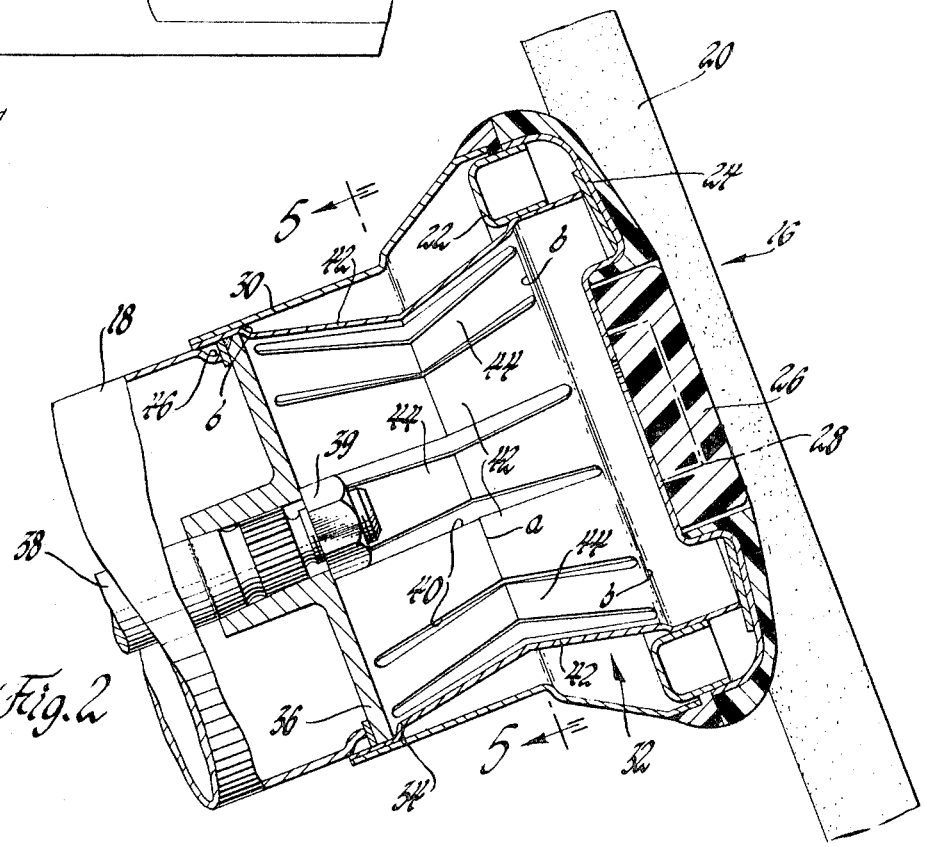
FIG. 2 is an enlarged partially broken away view of a portion of FIG. 1.

Referring to FIG. 2, the steering wheel 16 includes a rim 20 of generally conventional construction and including an inner steel core or the like covered with plastic or optional semirigid material suitable to some amount of energy dissipation under contact by the body of the vehicle operator. The rim is connected through suitable spoke structure, not shown, to a supporting annulus or ring 22 within the hub structure of the steering wheel. The ring 22 is of generally channel-shaped construction and has welded or like attachment at its outer periphery to a disclike cover cap 24 generally defining the axial end face of the steering wheel hub and having provided thereover a protective plastic or like semirigid decorative cover 26. Within the body of cover 26, provisions may be had for a central horn button 28 connected with switch mechanism in series with the vehicle horn. Below the cap 24 and having one end overlying the ring 22 is a decorative metal shroud of annular form 30 extending longitudinally to have its lower end overlying the upper terminal end of the mast jacket 18 of the steering column assembly 12.

Mounted within shroud 30 is an energy absorbing structure according to this invention, designated generally 32 and being comprised of a tubular member having its lower end suitably slidably fitted closely against the end portion of shroud 30, the annular end portion of the energy absorber 32 being shouldered at 34 and welded to the peripheral portion of a supporting disc 36 having a central hub portion thereof bored and splined for driving connection with the end of the steering shaft 38 within the steering column assembly 12, the disc being held thereon by a nut 39. The upper annular end of energy absorber 32 is flushly engaged with reinforcing structure cover 26 for direct imposition of generally axial loading on the cap 24 to the energy absorber and the supporting disc 36. The upper end portion of the energy absorber 32 further has suitable spot or like welded connection with the ring 22.

Figures 3, 4:
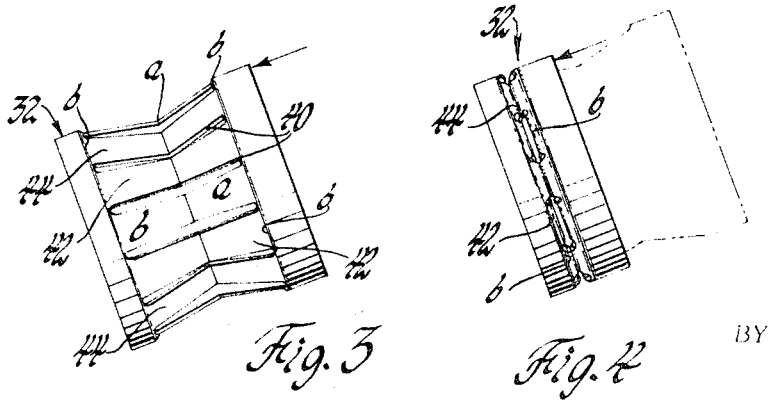
FIG. 3 is an elevational view of the energy absorber of this invention in an uncollapsed state.
FIG. 4 is a view similar to FIG. 3 showing the energy absorber in collapsed state.
Figure 5:
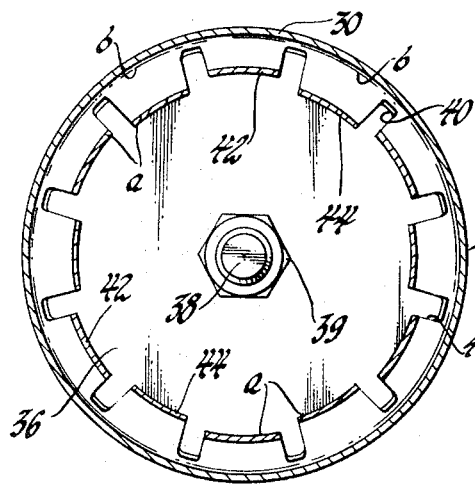
FIG. 5 is a sectional view taken generally along the plane indicated by lines 5-5 of FIG. 2 showing the energy absorbing hub portion thereof in an uncollapsed state.
Figure 8:
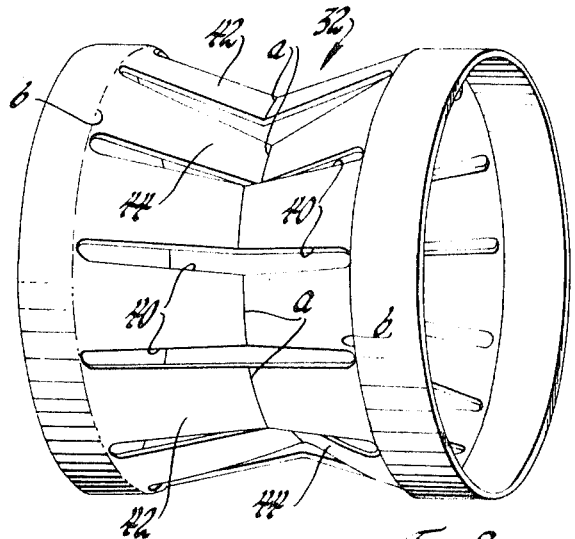
FIG. 8 is an enlarged perspective view of the energy absorber in an uncollapsed state.

As better seen in FIGS. 3, 5 and 8, the energy absorber 32 is provided in its main intermediate portion with a circumferential series of longitudinally extending slots 40 providing a like series of longitudinally extending strips each joined with the two annular ends of the energy absorber. Preferably, the slots are made somewhat wider midway therein than at their ends so that the strips are formed somewhat tapering as seen in elevation. As seen best in FIG. 3, each of the strips are formed with a radially inwardly deflected prebend and with a vertex or hinge line at *a* and end hinge lines at *b* connected with the annular end portions of the member. Thus, in profile the strips take a shallow inwardly bent V-shape.

In the preferred embodiment shown, there are two alternating sets of strips within the energy absorber 32 distinguished by the amount of radially inward prebend relative to the axial centerline of the absorber 32. Thus, between every other strip element 42 having a predetermined radially inward prebend of shallow amount, there is an intervening strip element 44 having a deeper radially inward prebend. Before formation of the radially inward prebend of the strips, as by striking on dies or the like, each of the strips are of equal length so that the forming operation contemplates more plastic strain in the deeper prebend strips 44 than in the other strips 42. The sectional view in FIG. 5 shows the relationship of the alternating strip elements 42 and 44 in their initial preformed or uncollapsed state, particularly showing the difference in radial location of the hinge line *a* of the alternating strips 42 and 44.

Figure 9:
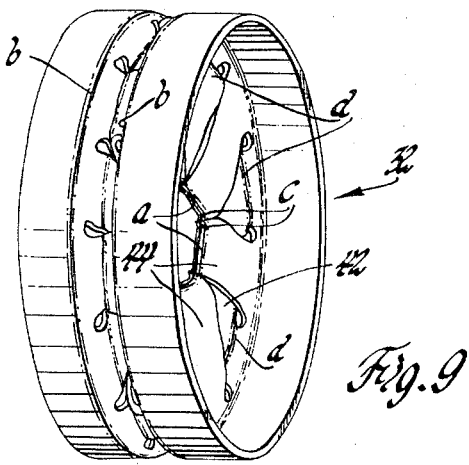
FIG. 9 is an enlarged view similar to FIG. 8 showing the energy absorber in collapsed state.

This alternate angular prebend and radial depth provides for a predictable buckling behavior in the various strips 42 and 44 under the imposition of a predetermined axial force from the impact of the drivers body or otherwise on the steering wheel 16 forwardly of the vehicle, to cause an axial crushing in the steering wheel hub portion occurring with or as a result of deflection of the rim 20. Forces applied through the cap 24 or the ring 22 to the energy absorber 32 are of course reacted at the supporting disc 36 held by the steering shaft and abutting end portion 46 of the mast jacket 18, the forces obtaining in the energy absorber for the present being assumed generally purely axial thereof and thus equally borne by the various strip elements 42, 44 in compression. As is well-known, axial compression forces in columnar elements such as the strips 42 and 44 will cause a buckling thereof and in the case of the radially inwardly prebent strips shown herein, will cause buckling of the strips at a predetermined level dictated largely by the buckling resistance in the shallower strips 44. Upon reaching of this predetermined level of axial impact force or the like, strips 42 and 44 are all caused to buckle further radially inwardly as seen in FIGS. 3 and 4 from their preformed shape into a nested relationship, best shown in FIGS. 6, 7 and 9. In this state, it is seen that each shallowly prebent strip 42 is overlapped or nested within the two adjacent deeper prebent strips 44. This arises from buckling or radial excursion of the deeper prebent strips 44 slightly ahead of the buckling of the strips 42. As the hinge line *a* of the strips 44 proceed radially inwardly however, the hinge line a of strips 42 gradually catch up therewith due to the fact that the strips 42 and 44 are of generally equal length, and at a point prior to the fully collapsed position in FIGS. 6, 7 and 9, the hinge lines *a* of the strips and the areas immediately adjacent thereto come into interfering engagement. As seen best in FIGS. 6 and 7, the overlapping areas of the deeper prebent strips 44 at their hinge lines *a* over the area of strip 42 intervening therebetween at its hinge line *a* are so engaged that during the radially inward buckling of the strips toward a final fully flattened condition shown, the equal lengths of the strips cause the inner strips 42 to be pushing radially inwardly to elongate the strips 44 while the strips 44 are of course providing a reaction thereto in tension causing longitudinal compression in the strips 42. The result is additional energy absorption caused by plastic deformation not only in the engaged portions at the hinge lines *a*, particularly a sort of edge curling of strips 44 at high local contact strain regions *c*, but also due to some overall tensile elongation in the strips 44 and a compressive buckling in the strips 42 particularly at the free or uncovered regions *d* thereof, FIG. 6.

It is to be appreciated that in addition to the additional energy absorption provided by the interfering engagement between the alternating underlapped and overlapped strips 42 and 44 during the final stages of axial crush in the energy absorber, the neat overlapping relationship which the strips take cause the energy absorber to be relatively insensitive to the actual direction of generally axial loading so that the energy absorber maintains its tendency toward a fully flattened collapsed condition even when the steering wheel hub or rim is struck along an axis as much as 25° from the centerline of the steering column. While, in these circumstances, one side of the steering wheel and the steering wheel hub including the energy absorber 32 is subject to higher loadings than other sides thereof, the inward buckling of the strips in this area is however such as to cause the stated overlapping nesting relationship so that as the strips 42 and 44 in this region buckle sufficiently inwardly to establish substantial interfering engagement, a chain reaction of successive interfering engagement continues throughout the circumferential series of strips at hinge lines *a* so that the buckling forces are transmitted completely around the periphery of the hub under this oblique loading tending the energy absorber 32 to thereby assume nearly as fully flattened or collapsed a configuration as obtains with purely axial loading.

Figure 7:
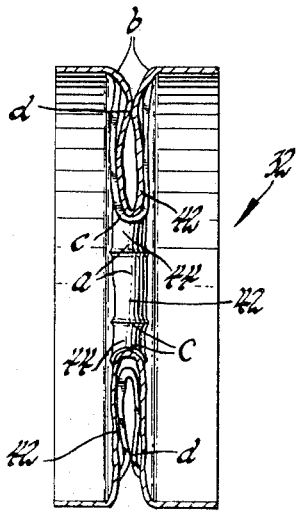
FIG. 7 is a sectional view taken generally along the plane indicated by lines 7-7 of FIG. 6.

In examination of FIG. 7 the benefits of the overlapping and underlapping relationship between the strips 42 and 44 causing the interfering engagement at their hinge lines *a* and the tendency for the strips to be alternately pushing and pulling on one another, also causes them to take a shape with a minimum radius of looping at their hinge lines *a*. Maximum collapse distance is thereby provided for the energy absorber 32 and the steering wheel hub 16.

Figure 6:
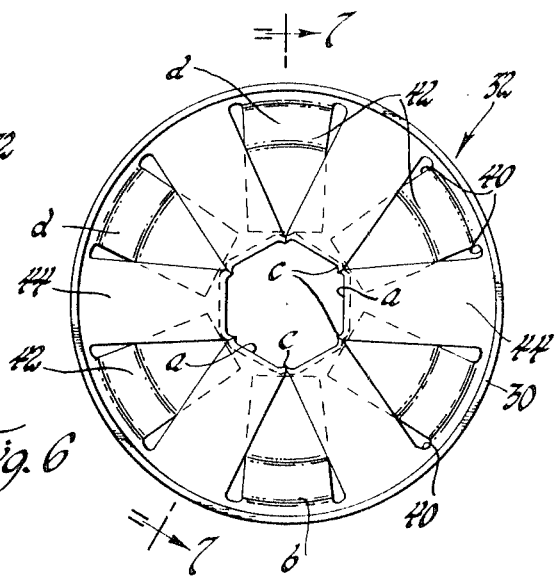
FIG. 6 is a view similar to FIG. 5 showing the hub portion in collapsed state.

While various angles of alternating shallow and deep prebend of the strips 42 and 44 may be found desirable upon experimentation, it has been found so far that best performance is realized with a shallow angle for the strips 42 at about 15° to the centerline of the energy absorber 32 while the deeper prebend in strips 44 are made at about 20° to the centerline. As shown, there are 12 strips formed in the energy absorbing member 32 each having a slightly tapered configuration to provide the interfering engagement at the final stages of collapse of the energy absorber and the additional local plastic strain, but however without undue edge interference between the strips 42 and 44 disturbing the orderly folding and overlapping relationship. Generally, however, the length, width and number of the strips may be selected to provide for a generally continuous annular surface formed during the full axial crush, such as shown in FIG. 6, having a diameter sufficiently great to include therewithin the diameter of the nut 39 of the end of the steering shaft 38.

It is of course appreciated that the larger the diameter of energy absorber 32 in its end annular portions, the greater may be made the collapse distance for the full axial crush therein occuring with radially inward bending of the strip elements. A number of strips larger than 12 may be provided in the energy absorber with consequent reduction in their width, while a lesser number but wider series of strips may also be provided. In addition to the dimensional considerations in the strips 42 and 44 outlined above, the effects of the material in the energy absorber 32 is of course also significant to energy absorption capacity and buckling load, including such items as material stock thickness, heat treatment, etc.

During the axial crushing of the hub portion of the steering wheel 16 against the reaction of the supporting disc 36 on the steering shaft and the bottoming on the mast jacket 18, the outer shroud 30 may freely telescope over the end of the mast jacket 18. Alternatively, if deformation of the shroud is made predictable it can be used as an additional energy absorber by welding its lower end to the energy absorber 32. It is seen that rather than having a radial outward bending of the strip elements 42 and 44, the radially inward bend thereof provided in this invention eliminates the need for any large amounts of protective covering over the strip elements, and the shroud 30 may be used as a neat, decorative, minimum diameter cover.

Having thus described the invention, what I claim is:

1. In an energy absorber of the type comprising a tubular member provided with an angularly spaced series of longitudinally extending slots defining a series of longitudinally extending strips subject to controlled buckling and plastic deformation under predetermined generally axial force on said tubular member causing axial crush therein, the improvement which comprises forming said strips each with a prebend radially inwardly of said tubular member such that under axial crush therein under said predetermined force said strips buckle further radially inwardly of said tubular member, the prebend of each of said strips being so formed with respect to the prebend of its neighbors in said series that during said axial crush said strips buckle further radially inwardly into an orderly overlapping relationship around said series of strips.

2. In an energy absorber of the type comprising a tubular member provided with an angularly spaced series of longitudinally extending slots defining a series of longitudinally extending strips subject to controlled buckling and plastic deformation under predetermined generally axial force on said tubular member causing axial crush therein, the improvement which comprises forming said strips each with a prebend radially inwardly of said tubular member such that under axial crush therein under said predetermined force said strips buckle further radially inwardly of said tubular member, said strips having alternate shallow and deeper prebend so that during said axial crush said strips buckle further radially inwardly into an orderly overlapping relationship around said series of strips.

3. In an energy absorber of the type comprising a tubular member provided with an angularly spaced series of longitudinally extending slots defining a series of longitudinally extending strips subject to controlled buckling and plastic deformation under predetermined generally axial force on said tubular member causing axial crush therein, the improvement which comprises forming said strips each with a prebend generally V-shape in profile inwardly of said tubular member such that under axial crush therein under said predetermined force said strips buckle further radially inwardly of said tubular member, said strips being of substantially equal length but deformed for prebend therein with the vertex of the V in adjacent strips being alternately shallow and deeper radially of said tubular member such that during said axial crush said strips buckle further radially inwardly into an orderly overlapping relationship around said series of strips and establish interfering engagement generally at such vertices for energy absorption therein additive to that in the buckling of said strips.

4. In a safety steering wheel, the combination of a rim, spoke means attached to the rim, a central axial load bearing tubular hub member attached to the spoke means and including in an intermediate portion thereof an angularly spaced series of longitudinally extended slots defining a series of longitudinally extending strips each formed with a prebend of generally V-shape in profile extending radially inwardly of said hub member, the prebend of each of said strips being so formed with respect to the prebend of its neighbors in said series in said hub portion such that under axial crushing forces thereon of predetermined force said strips buckle further radially inwardly of said hub member into an orderly overlapping relationship around said series of strips, and outer annular shroud means of relatively thin wall mounted over said hub member.